United States Patent [19]
Frick et al.

[11] 4,427,543
[45] Jan. 24, 1984

[54] AUTOMATIC TAPE FILTER

[75] Inventors: Charles E. Frick, South Charleston; Archie F. Skidmore, Hurricane; Isaac E. Williams, Charleston, all of W. Va.

[73] Assignee: Union Carbide Corporation, Danbury, Conn.

[21] Appl. No.: 451,179

[22] Filed: Dec. 20, 1982

[51] Int. Cl.³ .............................................. B01D 29/02
[52] U.S. Cl. .................................... 210/143; 210/387
[58] Field of Search ....................... 210/143, 387, 400; 55/352

[56] References Cited

U.S. PATENT DOCUMENTS

| | | | |
|---|---|---|---|
| 2,675,129 | 4/1954 | Doubleday | 210/387 |
| 2,679,158 | 5/1954 | Claydon et al. | 210/387 |
| 2,795,288 | 6/1957 | Hirs | 55/352 |
| 3,244,287 | 4/1966 | Staunton et al. | 210/387 |
| 3,310,172 | 3/1967 | Beduhn | 210/143 |
| 4,054,521 | 10/1977 | Winzen | 210/387 |

*Primary Examiner*—John Adee
*Attorney, Agent, or Firm*—David Fink

[57] ABSTRACT

A tape filter device for the removal of solids from liquid media having a weir assembly, which enables solids to be carried out by the water flow, into which a tape head support member having filtrate passages therein is immersed, such that liquid media flows tangentially across its guide surface. A tape transport mechanism pulls the tape from a supply source across the support member and deposits it in a collecting means.

8 Claims, 2 Drawing Figures

AUTOMATIC TAPE FILTER

TECHNICAL FIELD

The present invention relates to an apparatus for the removal of solids from liquid media, wherein said material is caused to flow through a filter media, such as filter tape. Through the use of the present invention a continuous or intermittent sample of liquid may be collected and analyzed.

BACKGROUND OF THE INVENTION

The problem of filtering a liquid containing contaminant particles in industrial applications without excessive manual operations or overly complex mechanical structure has long persisted. A reliable low-maintenance fine filter is needed to remove solids from wastewater samples, thereby insuring accurate analysis of the remaining liquid.

Various filtering methods have previously been employed. For example, a replaceable cartridge filter such as U.S. Pat. No. 3,495,463 provides a filter cartridge on a support means within a funnel shaped cavity. Though the filter cartridge is easily removable, filters such as these tend to absorb organic material and bleed it back into the sample stream over a long period of time. This can mask sample concentration peaks and make accurate analysis of a liquid sample a considerable problem. Furthermore, since said filters do encounter significant bleeding problems, they must be changed frequently.

Russian Pat. No. 251,242 discloses a tape filter device having a pivoting arm which is operated by a pneumatic system. The pivoting motion of the arm connects the sample liquid to the filter device. The filter device is situated such that the filter tape is vertically drawn across its surface. This device hampers the production of a uniform sample of filtered liquid since there is a build-up of solid matter at the bottom portion thereof. The vertical movement of the filter tape as the sample liquid is flowing through it, coupled with this build-up of solid material, prevents this device from providing a fresh filtering surface.

U.S. Pat. No. 3,471,017 discloses that a filter band or ribbon may be passed through inlet and outlet ports in a filtering apparatus across the path of material flow and that an adequate seal may be maintained at the inlet and outlet ports by carefully maintaining a solidified plug of the material within the ports as a sealant. A difference in size between the inlet plug and the outlet plug is relied upon to advance the filter band through the apparatus. To insure a complete seal of the plugs utilized in this apparatus, they must be sufficiently cooled to form a relatively solid mass which tends to bind in the inlet and outlet ports, and this makes filter screen changing difficult. If the plugs are formed in a less solid state, undesirable leakage of material occurs. Additionally, some materials do not exhibit an ability to form an adequate solidified plug. Furthermore, this apparatus utilizes high pressures associated with an extrusion process that force the filter band to dimple into the access holes of the back-up or breaker plate supporting the filter band. This makes it extremely difficult to change the position of the filter band. This patent is a relatively complicated device, which affords limited filter area, requires frequent changes of the filter media, and has a complicated mechanism to avoid leakage of contaminated liquid around the edges of the filter medium.

Another type of filter device, the "Fox Filter" Research Disclosure, 13356, (May 1975), has a tapered filter head which is "grooved and shaped" such that a strip of filter tape may be guided across a channel drilled through the side of the filter head. Filtered liquid is induced to flow through the tape into a channel located within the filter head via gravity or a vacuum. The filter head is mounted within a weir box having an inlet channel and an outlet channel. Liquid sample is fed into the weir box and allowed to overflow through the outlet channel located in the upper portion of the reservoir. The tapered configuration of the filter head provides poor sealing around the tape to filter head interface thereby allowing solid waste materials to contaminate the filtered sample. The apparatus is designed such that the weir must be drained before the filter can be changed and it must be disassembled for cleaning. Furthermore, the flow pattern through the rectangular weir box causes said weir to fill with solids above the tape head. The filter tape may thereby become clogged with solid material.

A need therefore, exists for a reliable low-maintenance fine filter to remove solids from wastewater samples.

The present invention provides a simplified apparatus which avoids leakage of contaminated liquid around the edges of the filter media through the unique configuration of the tape head, and provides a fresh filtering surface to avoid buildup of solid material on the filter media.

The present invention provides a liquid filter medium with a maximum of surface area which enables the filter medium to accommodate a sample of larger volume.

The unique design of the weir of the present invention prevents the buildup of solid material in the liquid channeling device.

The present invention provides an apparatus for intermittent or continuous sampling of liquid media.

SUMMARY OF THE INVENTION

The above and other features which will be apparent to those skilled in the art are achieved by the present invention, one aspect of which relates to:

A tape filter device for the removal of solids from liquid media comprising:

(a) a tape head support member having a guide surface, shaped and of a size such that an elongated band of filter media placed thereon, is tension fitted and in contact with the guide surface before it is immersed within the liquid media, and covers filtrate passage(s) therein, which connect to an outlet;

(b) means for supplying a continuous tape of filter media to the tape head support member;

(c) means for advancing filter media about the tape head support member such that filter media covers the filtrate passage(s) within the guide surface while providing that the filtrate passing through the guide surface, must pass through the filter medium;

(d) a weir having an outlet passage; curved to prevent it filling with solids, such that liquid media is channeled through the weir past the filter media and into the outlet passage;

(e) means for actuating the tape head support member such that said member travels in and out of the weir;

(f) the outlet of (a) for the removal of filtered liquid from the filtrate passage(s) and means for maintaining the pressure inside the collecting chamber lower than the pressure outside said chamber such that when the tape head support member is immersed in the weir, a pressure differential is created, thereby forcing liquid media to flow through filter media and into the collecting chamber; and (g) means for collecting the filter media once it has filled with solids in synchronization with means (b) so that clean filter media is repeatedly supplied to the tape head support member.

DETAILED DESCRIPTION OF THE DRAWING

Figure 1:
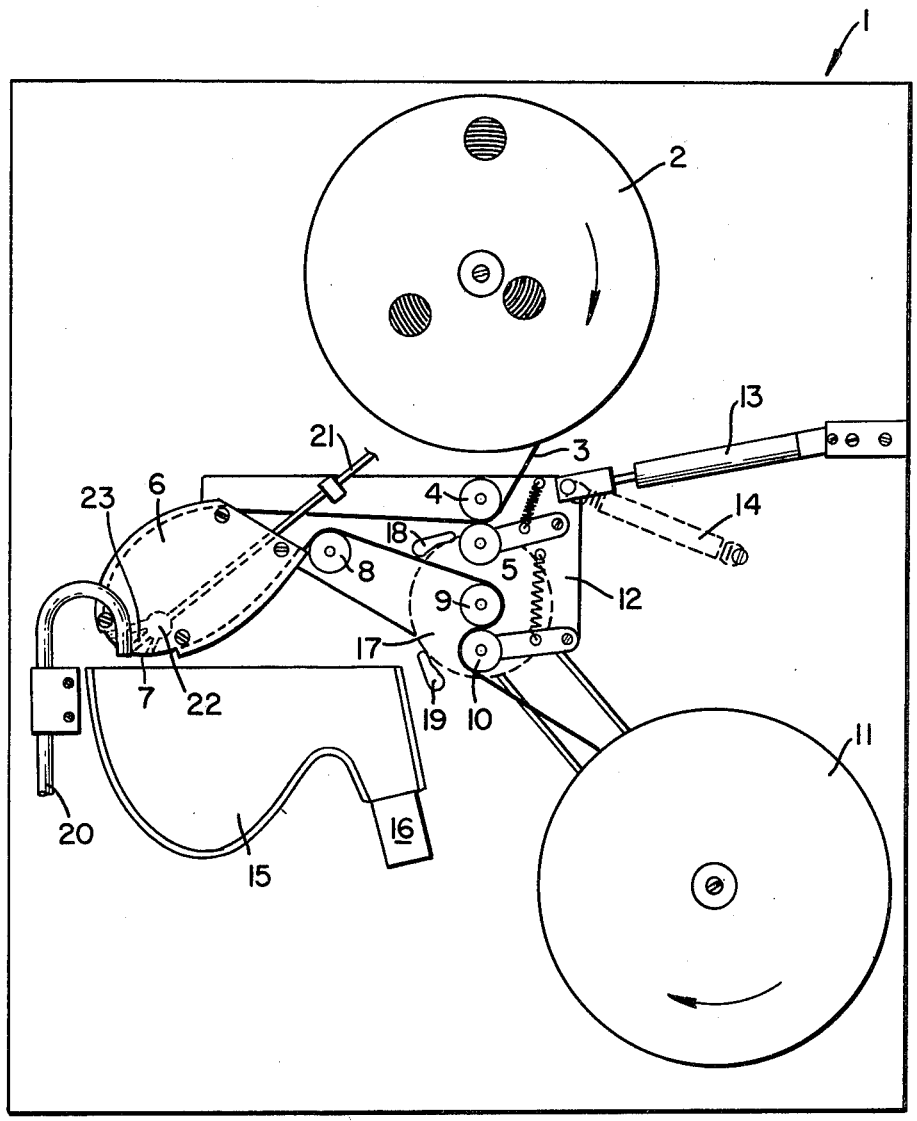
FIG. 1 is a schematic view of the tape filter apparatus.

With reference to FIG. 1, the present invention is mounted to a panel (1). A supply reel (2) supplies filter tape (3) which passes between tape guide rollers (4) and (5) to a tape head support member (6) and around its guide surface (7). Types of filter media include: filter paper, non-woven fibrous filters, or any other suitable material. The tape head support member (6) is grooved and shaped so that filter tape may be guided across and around its guide surface (7). The configuration of the tape head support member (6) enables the filter media to fit across its guide surface (7) in a manner that avoids leakage of the contaminated liquid around the edges of the filter medium. Furthermore, the filter media is in contact with the guide surface before it is immersed within the liquid media thus insuring that contaminated liquid does not contact the clean side of the filter tape. The filter tape is then passed over tape guide roller (8) and between a tape transport roller and a pressure roller (9) and (10) respectively, to take up reel (11). The tape transport roller (9) has teeth which enable it to grip the filter tape. Pressure roller (10) holds the tape in contact with tape transport roller (9).

The tape head support member (6) is secured to a tape head support plate (12) having a ratchet-operated tape transport system, which moves the tape through the guide rollers and around the tape head support member (6) as illustrated above. The filter tape is advanced over the guide surface (7) of the tape head support member (6) as the tape head support plate (12) is raised by means of the air actuator (13) or other similar means. It should be noted for the purposes of this invention that any driving means such as an electric motor, manual means, etc., may be utilized to drive the tape head support plate (12).

FIG. 1 illustrates the present invention with the tape head support plate (12) in its upright position. When the tape head support plate (12) is lowered by means of an air actuator (13), the attached tape head support member (6) is lowered into the weir (15). When the air pressure is removed, spring (14) exerts a force on the tape head support plate (12) thereby raising the attached tape support member (6) out of the weir (15). The force exerted by the air actuator (13) causes ratchet wheel (17) to rotate in a clockwise manner, thereby moving ratchet pawls (18) and (19) the appropriate number of notches.

As liquid media from the sample inlet tube (20) is channeled through the weir (15), the air actuator (13) moves tape head support plate (12) downward, thereby lowering tape head support member (6) into the weir (15). The shape of the weir (15) enables solids to be carried out by the flow of the liquid media as it is channeled through the weir (15) and into the outlet passages (16), thereby preventing the build up of solid matter.

Prior to lowering the tape head support member (6) into the weir (15) an aspirator (21), or other similar device for regulating air pressure, begins to lower the pressure within the collecting chamber (22) of the tape head support member (6). The filter tape is brought into contact with the tape head support member (6) before it is immersed in the weir (15) and it remains in contact with the tape head (6) until after it exits from the weir (15). This prevents the solids from contacting the clean side of the tape. Once the tape head support member (6) is immersed in the liquid media within the weir (15), the collecting chamber (22) is maintained at a pressure lower than the pressure outside said chamber. The lower pressure within the collecting chamber (22) forces the liquid media to flow through the filtrate passages (23) and into the collecting chamber (22). The lower pressure within the collecting chamber (22), in combination with the curvature of the tape head, further insures that the filter tape is securely situated against the guide surface (7) of the tape head support member (6). Additional tension is supplied by tape guide rollers (4) and (5). This additional tension prevents solid material from flowing around the filter tape and into the filtrate passages and contaminating the liquid sample.

The tape head support member (6) is shaped so as to cause liquid media to flow tangentially across its guide surface (7) when said member (6) is immersed within the weir. The tangential flow across the guide surface (7) prevents a buildup of solid organic material on the surface of the filter tape. A fresh filter surface is therefore always insured.

The apparatus as illustrated in FIG. 1 is utilized when an intermittent sample of liquid wastewater is needed. The filtered sample collects within collecting chamber (22), and is then removed via an aspirator (21) out of said chamber (22) to an analyzer.

Figure 2:
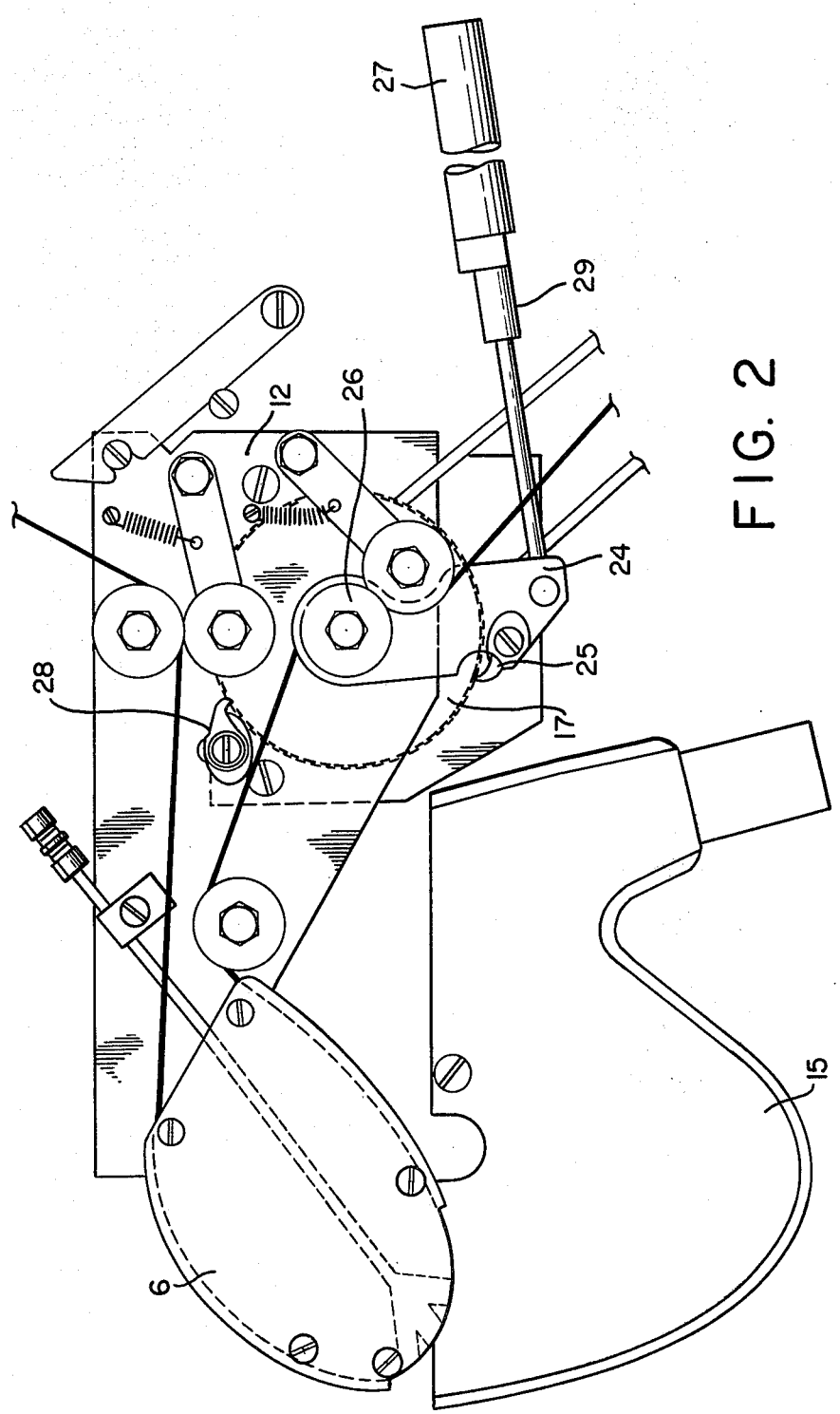
FIG. 2 is a schematic view of an alternate embodiment of the present invention.

An alternate embodiment of this invention, as illustrated in FIG. 2, is a tape filter device as depicted in FIG. 1 without a collecting chamber within the tape head support member (6). Utilizing this embodiment of the invention, a continuous sample of liquid wastewater of larger volume may be achieved. In this instance, the tape head support member (6) is continuously immersed within the weir (15). The tape head support member (6) is only lifted when the filter tape is changed. This provides an uninterrupted flow of contaminated liquid through the weir (15) and permits fresh tape to be installed without interrupting the filtering process.

This embodiment of the invention has a tape transport drive assembly with a ratchet lever (24) that pivots on the same center as the ratchet wheel (17). This lever (24) carries a pawl (25) that rotates the ratchet wheel (17) and its attached tape drive roller (26). A back stop pawl (28) on the tape head support plate (12) prevents the reverse rotation of the ratchet wheel (17). The ratchet lever (24) is driven by an air cylinder (27) or other suitable driving means, i.e., variable stroke crank electric motor. Any other suitable means for transporting the filter media may be utilized.

There are three methods of changing the tape transport speed. The variable stroke crank may be adjusted to move one or more notches on the ratchet wheel (17) per stroke, or a movable stop (29) on the air cylinder rod (27) may be adjusted to vary the number of notches moved on the ratchet wheel (17) per stroke. Additionally, the intervals between the strokes of the air cylinder may be varied by adjusting a timer (not shown) which controls the pulsating air supply to the air cylinder rod (27).

We claim:

1. A tape filter device for the removal of solids from liquid media comprising:
   (a) a tape head support member having a guide surface, shaped and of a size such that an elongated band of filter media is tension fitted and in contact with the guide surface before it is immersed within the liquid media and covers filtrate passage(s) therein, which openly connect to an outlet;
   (b) means for supplying a continuous tape of filter media to the tape head support member;
   (c) means for advancing filter media about the tape head support member such that the filter media covers the filtrate passage(s) within the guide surface, while providing that the filtrate passing through the guide surface must pass through the filter medium;
   (d) a weir having an outlet passage, curved to prevent it filling with solids, such that liquid media is channeled through the weir past the filter media and into the outlet passage;
   (e) means for actuating the tape head support member such that said member travels in and out of the weir;
   (f) the outlet of (a) for the removal of filtered liquid from the filtrate passage(s) and means for maintaining the pressure inside the collecting chamber lower than the pressure outside said chamber such that when the tape head support member is immersed in the weir, a pressure differential is created, thereby forcing liquid media to flow through the filter media and into the collecting chamber; and
   (g) means for collecting the filter media once it has filled with solids in synchronization with means (b) so that clean filter media is repeatedly supplied to the tape head support member.

2. The tape filter device of claim 1 wherein the means for actuating the tape head support member comprises an air cylinder.

3. The tape filter device of claim 1 wherein the means for actuating the tape head support member comprises an electric motor with a variable stroke crank.

4. The tape filter device of claim 1 wherein the means for advancing the filter media comprises a ratchet-operated tape transport system having a ratchet lever operated at various intervals by the actuating means such that filter media is pulled from the supply source across the tape head support member and deposited on a collecting means.

5. The tape filter device of claim 1 wherein the filtrate passages within the guide surface openly connect to a collecting chamber before connecting with the outlet of (f).

6. The tape filter device of claim 5, wherein the means for actuating the tape head support member comprises an air cylinder.

7. The tape filter device of claim 5, wherein the means for actuating the tape head support member comprises an electric motor with a variable stroke crank.

8. The tape filter device of claim 5, wherein the means for advancing the filter media comprises a ratchet-operated tape transport system in which the driving pawl is carried on the tape head support plate and moves relative to the ratchet wheel as the tape head support member moves in and out of the weir.

* * * * *